Nov. 23, 1965 J. R. RUHLMAN 3,219,298
APPLIANCE FOR LINEAR BODIES
Filed June 28, 1961 2 Sheets-Sheet 2
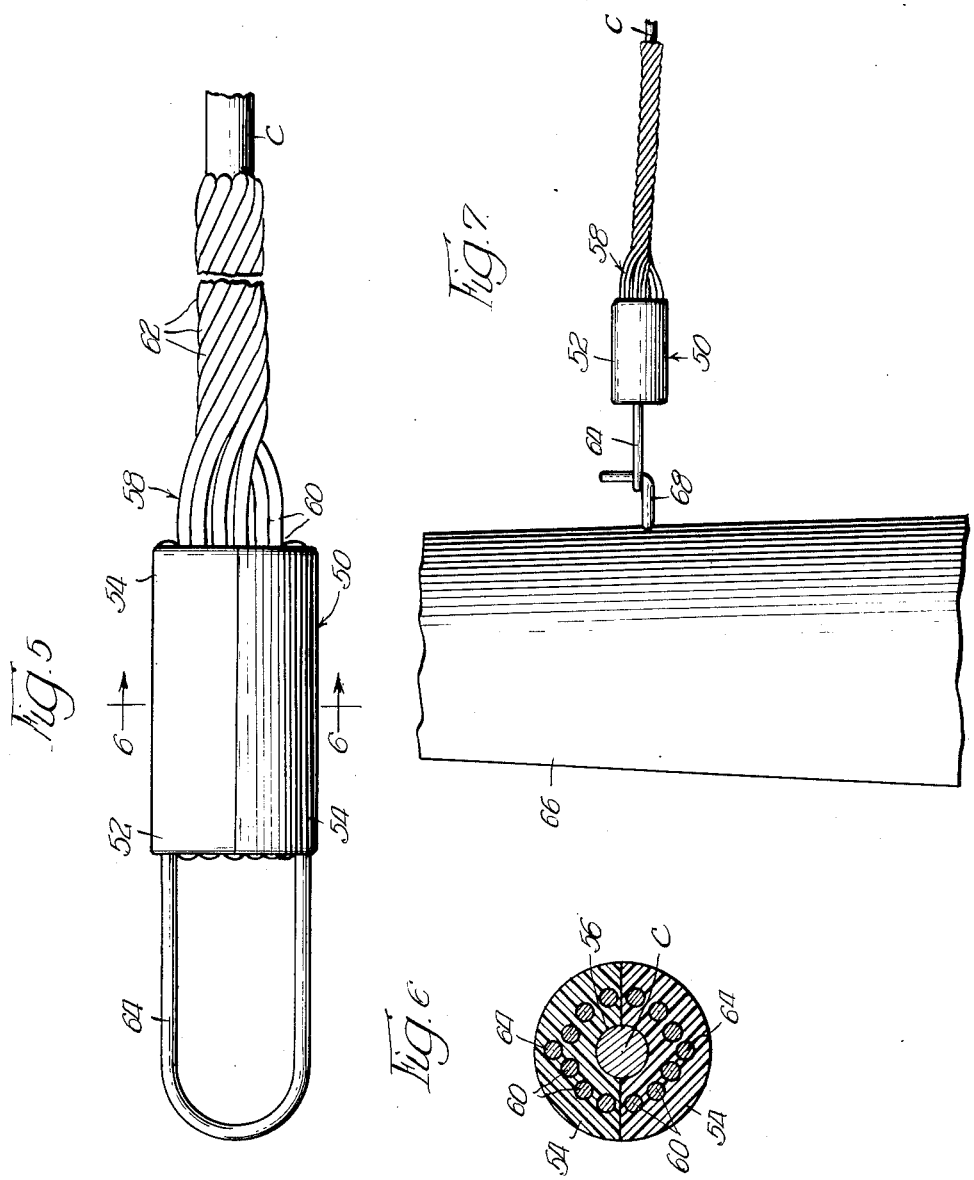
INVENTOR.
Jon R Ruhlman,
BY
Byron, Hume, Groen + Clement.

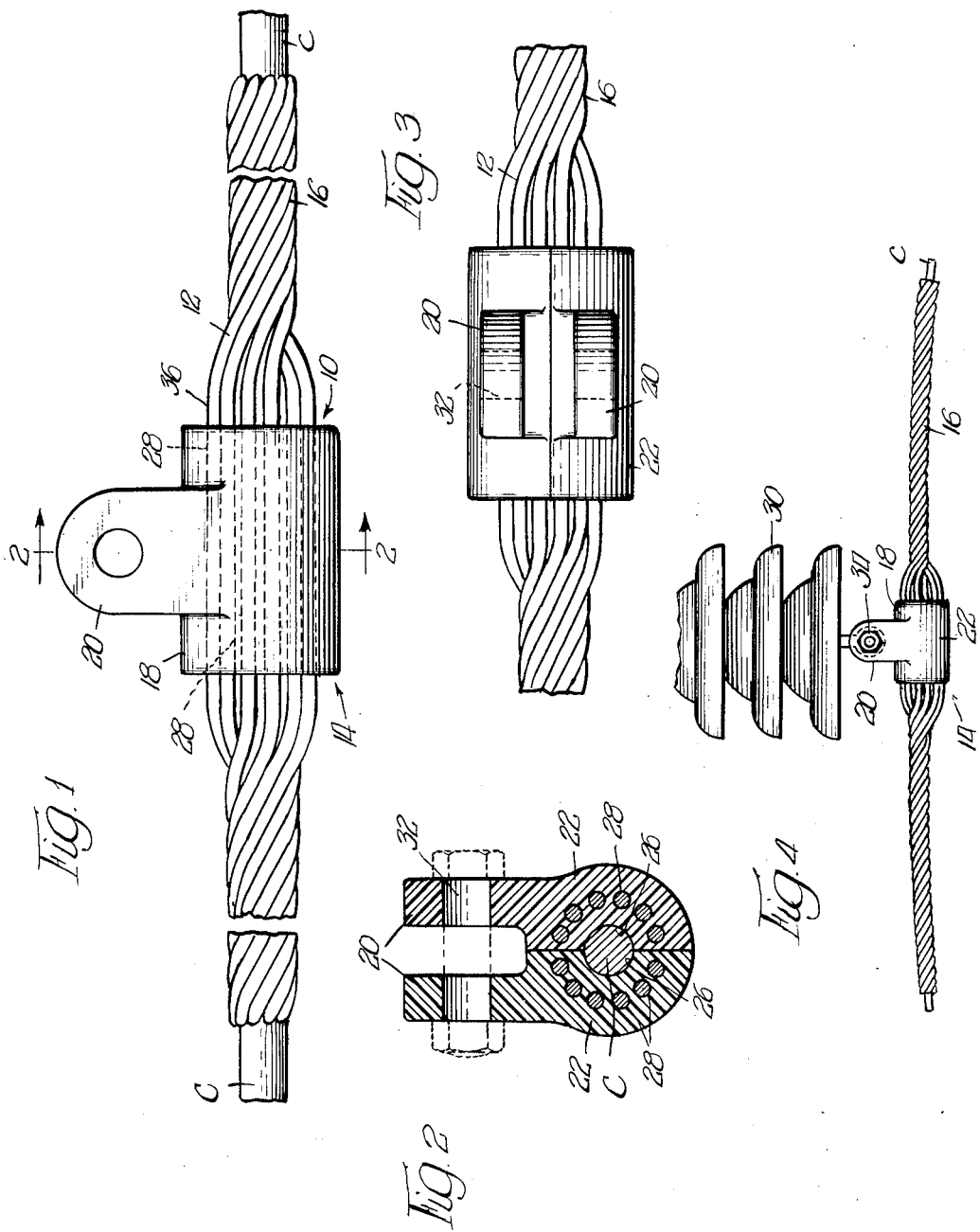

United States Patent Office 3,219,298
Patented Nov. 23, 1965

3,219,298
APPLIANCE FOR LINEAR BODIES
Jon R. Ruhlman, Cleveland, Ohio, assignor to Preformed Line Products Company, Cleveland, Ohio, a corporation of Ohio
Filed June 28, 1961, Ser. No. 120,329
4 Claims. (Cl. 248—63)

This invention pertains to an appliance for linear bodies and more specifically to an appliance for reinforcing and suspending linear bodies, such as electrical conductors, cables and the like.

Numerous devices have been developed and utilized in the past for suspending linear bodies and one device which has been particularly successful utilizes helically preshaped elements as is shown in the United States Letters Patent to Peterson No. 2,722,393 issued on November 1, 1955, and bearing the title, Reinforcement and Suspension of Linear Bodies. The patented device, as mentioned previously, utilizes helically shaped elements which have been formed to a mutually conforming internal diameter and pitch length of sufficient magnitude that they may be applied to a linear body from the side without exceeding the elastic limit of the elements. The helical elements are adapted to be wrapped around a linear body and in the preferred embodiment have an internal diameter slightly less than the external diameter of the cable of application, so the former tightly grips the latter. The suspension device, shown in the aforementioned patent also includes a pair of protuberating members which, in essence, are ellipsoidal in shape and are adapted to be applied along their major axes to the linear body in a tandem relationship. The helically formed elements are wrapped around the linear body and the protuberating members so as to extend axially in both directions from the latter so as to clamp the protuberating devices to the linear body. The combination of the two ellipsoidal shapes and the helically formed elements result in a generally hourglass construction. At the waist between the protuberating members, the helically formed elements are embraced by a pair of bearing shoes which, in turn, receive a clevis member having a journal for attaching the same to an external suspension means such as an insulator or the like. This construction represents a significant improvement over prior art devices and as a result has enjoyed widespread acceptance. One of the reasons for such acceptance is the inherent advantages of the helically formed elements such as ease of applicability, natural resiliency, shielding of the cable, and minimum of stress concentration.

It has been found in a few instances, however, that the construction shown in the aforementioned patent has one characteristic which limits its applicability. Specifically, the patented construction utilizes a substantially large number of individual components which must be correctly assembled on the linear body of association, so that the very number of these components somewhat complicates the construction of the device. The subject invention has a foremost feature of obviating the problem presented by the number of elements in the reinforcement and suspension device shown in the aforementioned patent. At the same time, the invention retains all of the advantages of the helically formed elements as have been set forth previously.

Briefly, the invention may be characterized as an annular member, or sleeve, having an internal diameter substantially equal to the external diameter of the line of application. A plurality of elements are embedded in the annular member and project from at least one end thereof and are annularly spaced therearound with the elements having been helically formed prior to the application to a linear body with the pitch and internal diameter being of sufficient magnitude to permit application to a linear body from the side without exceeding the elastic limit of the elements. In this manner the helically formed elements hold the sleeve into fixed association with the linear body when wrapped around the latter. The annular member may be provided with means for facilitating its attachment to an external suspension device.

A foremost object of the invention is to provide a suspension and reinforcing device for linear bodies, such as electrical conductors, cables, and the like.

Another object of the invention resides in the provision of a reinforcing and suspension device for linear bodies which utilizes helically preshaped elements.

Another object of the invention resides in the provision of a cable-reinforcing and suspension device in which the bearing member is integrally secured to the helically formed elements.

A still further form of the invention resides in the provision of a cable-reinforcing and suspension device which may be readily assembled to a linear body, and which is composed of a minimum number of components.

These and other objects will be apparent upon reading of the specification with reference to the following drawings:

In the drawings:
FIGURE 1 is a view in elevation of the cable reinforcement and suspension device embodying the invention.
FIGURE 2 is a sectional view taken along the lines 2—2 in FIGURE 1.
FIGURE 3 is a fragmentary plan view in elevation of the device shown in FIGURE 1.
FIGURE 4 illustrates the invention as attached to an external supporting means.
FIGURE 5 is a view in elevation of a modified form of the cable reinforcement and suspension device embodying the invention.
FIGURE 6 is a sectional view taken along the lines 6—6 in FIGURE 5.
FIGURE 7 illustrates the invention as attached to an external supporting means.

Throughout the specification the term "elements" shall be used with reference to those members which secure the cable-reinforcing and suspension device to a linear body. In the drawing these elements are shown as being rod-like members which have a substantially circular cross section. It is to be understood that such a showing is merely by way of example and that the members may have other constructions and in no way are limited to the illustrated cylindrical construction.

These elements and the other components comprising the inventive combination may be constructed of any suitable material having the properties and characteristics to permit the respective elements to fulfill the use and task to which they are assigned. For example, the aforementioned elements may be constructed of materials such as plastic or metals, depending upon the particular application for the cable reinforcing and suspension device.

For purposes of convenience the term "conductor" shall be used hereinafter. It is to be understood that a conductor is but one type of a linear body and that such usage is in no way limiting.

Referring now to the drawings, there is shown the inventive cable reinforcement and suspension device, generally denoted by the numeral 10. The device comprises a plurality of elements 12 and a bearing member generally denoted by the numeral 14. The elements 12 for portions 16 of their lengths have been helically formed prior to application to a cable C to a mutually conforming internal diameter and helical pitch of sufficient magnitude to permit application of the elements to the cable from the side without exceeding their elastic limit. If it should be desired that the elements 12 grip the conductor C at their helically formed portions 16, the internal diameter of the helix should be slightly less than the external diameter of the conductor. In practice it has been found that optimum gripping characteristics are obtained where the internal diameter is approximately 85% of the external diameter of the conductor. To further enhance the gripping characteristics of the elements, it may be desirable in some instances to coat them with grit of some suitable type, such as aluminum oxide. If, on the other hand, it is desirable that the conductor be movable axially with respect to the device 10, then the internal diameter of the elements 12 throughout the portions 16 should be slightly greater than the external diameter of the conductor C.

The annular bearing member 14 is mounted intermediate the helically formed portions 16. The bearing member 14 is composed of annular member or sleeve 18 and a means for securing the same to an external supporting means such as the lugs 20. The sleeve 18 in its preferred embodiment is composed of the complementary halves 22, as can be seen in FIGURE 4. Each of the halves includes the semi-cylindrical recess 26, having a radius of curvature substantially equal to the circumference of the conductor C. The halves 22 are adapted to receive the conductor C in their respective recesses 26.

Each of the halves 22 is provided with a plurality of annularly spaced apertures 28 for receiving the elements 12. In the embodiment shown in the drawings, the apertures 28 extend completely through their respective halves as shown by the dotted lines so that elements 12 may pass therethrough and project from each end as shown in FIGURE 1. It will be apparent that one modification of the construction shown in the drawings would comprise apertures which extend only partially through the halves 22. In that construction, it would be necessary to include two sets of elements for each of the halves with each element projecting from one of the ends of its respective sleeve half.

As can be seen in FIGURE 2, the apertures 28 are located substantially midway between the internal and external diameters of the sleeve. As a result, the elements 12 are positioned about an annulus which is substantially larger in diameter than the internal diameter of the helical portion 16. In this manner the elements 12 must be bent so that the helical portions 16 can be brought into association with the conductor. As a result of the bending, the elements 12 bias their respective sleeve halves 22 into a tightly engaging relationship with the conductor.

As mentioned previously, each of the sleeve halves 22 is provided with the means for attaching the cable reinforcement and suspension device to an external support means such as the insulator 30, as can be seen in FIGURE 4. The attaching means comprises the lugs 20 which include the journals 32. When the sleeve halves are placed into mating engagement on a conductor, the lugs 20 form a bifurcated or clevis arrangement, as can be seen in FIGURE 4. The journal 32 of lugs 20 are adapted to receive the pin member 34 which is secured to the insulator 30. In this manner the reinforcing and suspension device may be secured to some external supporting device such as an insulator mounted on a line tower or pole.

The sleeve 18 may be constructed of any suitable material. One material which has been found particularly suited for this use is fibre glass which may be readily molded into the desired configuration. It will be apparent, however, that other types of material, particularly those that are moldable, may be used in the construction of the sleeve. One particular advantage of the fibreglass material is that the elements 12 may be constructed to their desired form prior to assembly with the sleeve 18. For example, the elements 12 may be helically formed along two spaced portions 16, as shown in FIGURE 1. The portion 36, intermediate the helical portions 16, of the elements 12, may be left in a substantially straight construction, suitable for passing through the annular portion of the sleeve member 18. It will be apparent, however, that it is not necessary for the intermediate portion 36 to be of a straight configuration, but that they may be bent or curved so as to follow a tortuous path and through the sleeve 18, and thus possibly provide a stronger mechanical bond with the latter. In any event, after the elements 12 have been formed to their desired configuration, the intermediate portions of the required number of elements are then properly fixed in a mold cavity suitable for forming the sleeve 18. In the configuration shown in the drawings, the mold cavities will be such to form the halves 22. In that type of construction, each of the halves will include a half lay of elements so that the two halves in cooperation provide a full lay of elements. By full lay of elements it is meant the number of elements required when helically formed to constitute a closed tubular envelope, as shown in FIGURE 1. In this particular construction, a full lay is composed of 12 elements, with a half lay being composed of six elements. The elements in each of the halves are arranged in a substantially continuous or bridging relationship throughout the helically formed portion. It may be desirable in some instances to provide some means such as adhesive, resins or the like, for securing the elements throughout the helical portions into a bridging relationship. In this manner, the half set of elements associated with one of the sleeve halves constitutes a helical band throughout the helically formed portions.

When the sleeve halves 22 and 24 are mounted in mating engagement, their respective half lays are in opposing phase relationship. In other words, the elements of one half lay fall intermediate the first and last elements of the other half lay, so as to comprise the tubular envelopes mentioned previously.

In the embodiment shown in FIGURE 1, the helical pitch from both sides of the sleeve 18 is of the same hand of lay. It will be apparent that the hand of lay may be reversed where desired.

From the aforegoing it can be seen that the cable reinforcement and suspension device comprises essentially two components. Specifically, the device is composed of the two semi-annular sleeve members with a plurality of helically formed members projecting from their respective ends. The device may be readily assembled to a conductor by simply placing one of the halves in engagement with the conductor and then wrapping the helically formed portions of the elements 12 projecting therefrom. The construction may be completed by placing the remaining half into mating relationship with the first half and then wrapping its elements 12 around the conductor. As soon as the latter operation is completed, the reinforcement and suspension device may then be attached to the external support means.

Referring now to FIGURE 5 there is shown a modification of the cable reinforcement and suspension device which is generally denoted by the numeral 50. This modification 50 is adapted for suspending the ends of the conductor and is commonly referred to as a dead-end. In essence, the modification 50 includes an annular member 52 which is composed of two semi-cylindrical halves 54.

As can be seen in FIGURE 6, the semi-cylindrical halves 54 define a bore 56 similar to that shown in the first embodiment described with reference to FIGURE 1 through 4. The bore 56 is adapted to receive a conductor C as shown in FIGURE 5. Since it is desired that the dead-end provide as much holding power as possible in the preferred form of the annular member 52, the bore 56 will be slightly less in diameter than the external diameter of the conductor. Thus the member 52 will grippingly engage the conductor so as to prevent axial movement. To further enhance the gripping characteristics of the member 52, it may be desirable to serrate the surface of the bore 56 or to coat it with a grit, such as aluminum oxide.

A plurality of elements 58 are mounted in spaced relationship about the member 52 and extend therefrom. The elements 58 include the substantially straight portions 60 which are embedded within the member 52 so as to prevent removal therefrom. It can be seen that the elements 58 are substantially co-terminus with one end of the member 52 and project therefrom at the other end. At the co-terminus end the elements 58 may be headed over so as to reinforce the mechanical bond between them and the member 52. At the projecting end the elements have been helically formed as previously described to a mutually conforming pitch length and internal diameter of sufficient magnitude to permit them to be applied from the side to a conductor without exceeding their elastic limits. Since the portions 60 are spaced about a diameter substantially greater than that of the conductor, the helical portions 62 must be resiliently bent to be brought into coaxial engagement with the conductor. As a result of the bending the semi-cylindrical halves are forced into mating engagement on the conductor as described previously. In order to achieve gripping of the conductor the helical portions 62 in their preferred form will have an internal diameter somewhat less than the external diameter of the conductor, as described previously.

The modification 52 further includes the bight 64 which is constructed of a single strand looped at one end. The return bent portions of the strand 64 are embedded in the member 52 so as to prevent removal therefrom. It may be desirable as shown in FIGURE 5 for the strand to extend completely through the member 52 with the free ends being clinched or headed over so as to enhance the mechanical bond between it and the strand.

In FIGURE 7 the modification 52 is shown as mounted on a conductor and attached to an external suspension means, such as the line pole 66. The bight 64 engages a hook 68 or some similar suspension means for suspending the conductor C.

It will be apparent that the bight 64 may be constructed in ways other than that shown in the drawing and described previously. As a matter of fact the bight 64 may be composed of a clevis member which is secured at one end to the member 52 and having journals at their outer ends for receiving a bolt or a cross member of some suitable type. The bight 64 may also be constructed of the elements 58 which, instead of terminating at one end of the member 52, project from both ends with those at one end being secured together at their outer ends to form a bight. In fact the elements 58 may comprise a half lay which is return bent at its midpoint with each half lay being embedded intermediate its ends in one of the semi-cylindrical halves 54, as described previously. When constructed in such a manner the elements 58 may or may not be helically formed throughout the bight. It will be noted that when a half lay of the elements 58 are return bent that the point of bending may be predetermined so that the helically formed portions of the return bent lays are in opposing phase relationship so as to form a full lay upon intertwisting.

An important additional feature of the modification shown in FIGURES 5 through 7 and the alternative constructions described in the previous paragraph is the prevention of crushing at the throat of the bight. It has been found with dead end constructed solely of helically formed elements as shown in United States Letters Patent to Peterson bearing No. 2,761,273 that the gripping force exerted on the conductor at the throat of the bight is considerably enhanced when the conductor and the dead end are subjected to heavy tensile loads. While such a characteristic is beneficial in some instances it has been found that it tends to crush and cut some types of conductors and particularly the insulation, if such is present. The rigidity of the annular member 52 obviates the problem of crushing at the throat.

Although certain specific terminology and constructions have been used and described throughout the specification it is to be understood that this is merely by way of example and in no manner to be considered as a limitation. It will be apparent that certain modifications may be made within the scope of the claims without departing from the spirit of the invention.

It is claimed:

1. An appliance for suspending linear bodies comprising a plurality of resilient elements helically formed prior to application to one of said linear bodies to a mutually conforming internal diameter, hand of lay, and pitch length of sufficient magnitude to permit application to one of said linear bodies from the side without exceeding the elastic limit of said elements, an annular member intermediate the ends of said element, said elements being imbedded in the annular member and extending axially therethrough, whereby said elements and said annular member are adapted to embrace said linear body with said helically formed portions being coaxial with said linear body.

2. The combination comprising a suspended linear body, a pair of semi-cylindrical members, said semi-cylindrical members having an internal radius substantially equal to the external diameter of said linear body and having means for attaching said appliance to external suspension means, a half lay of resilient elements embedded in and spaced about each of said semi-cylindrical members and axially projecting from at least one of their respective ends, said elements being helically formed prior to application to said linear body to a mutually conforming internal diameter, hand of lay, and pitch length of sufficient magnitude to permit application to said linear body from the side without exceeding the elastic limit of said elements, said internal diameter being slightly less than the external diameter of said linear body, said elements being wrapped around said linear body to hold said semi-cylindrical members in mating relationship so as to embrace said linear body.

3. The combination according to claim 2 in which said elements project from both ends of said semi-cylindrical members.

4. The combination comprising a suspended linear body, an annular member, a plurality of annularly spaced resilient elements embedded in said annular member and axially projecting from at least one end thereof, said elements being helically formed prior to application to said linear body to a mutually conforming internal diameter, hand of lay, and pitch length of sufficient magnitude to permit application to said linear body from the side without exceeding the elastic limit of said elements, said elements and said annular member coaxially embracing said linear body.

References Cited by the Examiner

UNITED STATES PATENTS

| 2,189,987 | 2/1940 | Kellems | 24—123 X |
| 2,275,019 | 3/1942 | Peterson | 248—63 X |
| 2,722,393 | 11/1955 | Peterson | 248—63 |
| 2,729,054 | 1/1956 | Peterson | 248—63 X |
| 2,740,178 | 4/1956 | Kellems | 24—123 |

FOREIGN PATENTS 864,361   1/1941   France.

FRANK L. ABBOTT, Primary Examiner.

ROBERT C. RIORDAN, CLAUDE A. LE ROY,
*Examiners.*